(12) United States Patent
Hwang et al.

(10) Patent No.: US 11,967,699 B2
(45) Date of Patent: Apr. 23, 2024

(54) PRE-LITHIATION REACTION CHAMBER APPARATUS

(71) Applicant: LG ENERGY SOLUTION, LTD., Seoul (KR)

(72) Inventors: Seung-Hae Hwang, Daejeon (KR); Ye-Ri Kim, Daejeon (KR); Oh-Byong Chae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 427 days.

(21) Appl. No.: 17/419,636

(22) PCT Filed: Sep. 3, 2020

(86) PCT No.: PCT/KR2020/011892
§ 371 (c)(1),
(2) Date: Jun. 29, 2021

(87) PCT Pub. No.: WO2021/045544
PCT Pub. Date: Mar. 11, 2021

(65) Prior Publication Data
US 2022/0085349 A1 Mar. 17, 2022

(30) Foreign Application Priority Data

Sep. 6, 2019 (KR) .................. 10-2019-0110757

(51) Int. Cl.
*H01M 4/04* (2006.01)
*H01M 4/02* (2006.01)
(Continued)

(52) U.S. Cl.
CPC ....... *H01M 4/0459* (2013.01); *H01M 4/0445* (2013.01); *H01M 4/139* (2013.01); *H01M 10/052* (2013.01); *H01M 2004/027* (2013.01)

(58) Field of Classification Search
None
See application file for complete search history.

(56) References Cited

U.S. PATENT DOCUMENTS 5,162,176 A 11/1992 Herr et al.
2007/0142532 A1* 6/2007 Lee .................. B01J 20/3206
524/436

(Continued)

FOREIGN PATENT DOCUMENTS

CN 103117406 A 5/2013
CN 105514497 A 4/2016
(Continued)

OTHER PUBLICATIONS

International Search Report for PCT/KR2020/011892 (PCT/ISA/210) dated Dec. 21, 2020.
(Continued)

*Primary Examiner* — Louis J Rufo
(74) *Attorney, Agent, or Firm* — Birch, Stewart, Kolasch & Birch, LLP

(57) ABSTRACT

A pre-lithiation reaction chamber apparatus including a pre-lithiation reaction vessel which can prevent harmful effects caused by water that may be generated during pre-lithiation is provided. The pre-lithiation reaction vessel includes an electrolyte including a lithium salt, a negative electrode for a lithium secondary battery and a lithium ion-supplying member. Each of the negative electrode for the lithium secondary battery and the lithium ion-supplying member is at least partially in contact with the electrolyte. The pre-lithiation reaction chamber apparatus further includes a water-capturing vessel. The water-capturing vessel includes water-capturing powder, a container configured to receive the water-capturing powder, and a position-
(Continued)

changing member configured to change a position of the water-capturing powder in the container.

9 Claims, 6 Drawing Sheets

(51) Int. Cl.
*H01M 4/139* (2010.01)
*H01M 10/052* (2010.01)

(56) References Cited

U.S. PATENT DOCUMENTS

| | | | |
|---|---|---|---|
| 2010/0297479 A1 | 11/2010 | Tsuchida et al. | |
| 2013/0327648 A1* | 12/2013 | Grant | C25D 3/665 205/59 |
| 2014/0166491 A1* | 6/2014 | Grant | H01G 9/0029 205/59 |
| 2014/0310951 A1 | 10/2014 | Grant et al. | |
| 2015/0017543 A1 | 1/2015 | Lee et al. | |
| 2016/0141596 A1* | 5/2016 | Uhm | H01M 4/0435 429/231.95 |
| 2020/0058929 A1 | 2/2020 | Chae et al. | |
| 2021/0126250 A1 | 4/2021 | Jiang et al. | |

FOREIGN PATENT DOCUMENTS

| | | |
|---|---|---|
| CN | 106785051 A | 5/2017 |
| CN | 106816657 A | 6/2017 |
| CN | 108461714 A | 8/2018 |
| CN | 110010863 A | 7/2019 |
| EP | 2 951 872 A1 | 12/2015 |
| KR | 10-0652903 B1 | 12/2006 |
| KR | 10-2010-0112159 A | 10/2010 |
| KR | 10-2011-0112600 A | 10/2011 |
| KR | 10-2015-0014676 A | 2/2015 |
| KR | 10-2015-0110797 A | 10/2015 |
| KR | 10-2019-0017149 A | 2/2019 |
| KR | 10-2019-0071301 A | 6/2019 |
| KR | 10-2005984 B1 | 7/2019 |
| WO | WO 2014/142523 A1 | 9/2018 |
| WO | WO 2018/191843 A1 | 10/2018 |
| WO | WO 2020/123174 A1 | 6/2020 |

OTHER PUBLICATIONS

Extended European Search Report for European Application No. 20861076.6, dated Mar. 24, 2022.
Piwko et al., "Enabling electrolyte compositions for columnar silicon anodes in high energy secondary batteries", Journal of Power Sources, Elsevier, Amsterdam, NL, vol. 362, Jul. 21, 2017, pp. 349-357.

* cited by examiner

PRE-LITHIATION REACTION CHAMBER APPARATUS

TECHNICAL FIELD

The present disclosure relates to a pre-lithiation reaction chamber apparatus.

The present application claims priority to Korean Patent Application No. 10-2019-0110757 filed on Sep. 6, 2019 in the Republic of Korea, the disclosures of which are incorporated herein by reference.

BACKGROUND ART

In the field of lithium secondary batteries, a pre-lithiation process refers to a process for preliminary lithiation of an electrode, particularly a negative electrode, to a predetermined level.

As shown in FIG. 1, such a pre-lithiation process is carried out in a reaction vessel 200, such as a container 210, in which an electrolyte 220 containing a lithium source is received and a negative electrode 230 and lithium metal 240 are in contact with each other. The pre-lithiation reaction vessel 200 is disposed in a kind of a reaction chamber apparatus 100, such as a dry room.

In general, pre-lithiation is carried out after a reaction vessel configured to carry out pre-lithiation is introduced to a dry room. However, it is very difficult to control the water content in the dry room atmosphere to a level of less than 10 ppm due to a process of introducing the pre-lithiation reaction vessel to the dry room, or the like.

Meanwhile, the dry room atmosphere includes water, most of which has a dew point of −50 to −60° C., at approximately 15-50 ppm. When the water content present in the dry room is dissolved in the electrolyte at a level of 10 ppm, it reacts with a lithium salt, such as $LiPF_6$, to form a byproduct, such as $PF_5$.

The byproduct, such as $PF_5$, may break the solid electrolyte interphase (SEI) film formed on a negative electrode. In this case, surplus lithium ions introduced to the negative electrode are oxidized due to high reactivity, and thus the negative electrode is easily returned to its original discharged state, i.e. non-lithiated state.

DISCLOSURE

Technical Problem

The present disclosure is designed to solve the problems of the related art, and therefore the present disclosure is focused on a need for controlling the water content in a pre-lithiation atmosphere.

Therefore, the present disclosure is directed to providing a pre-lithiation reaction chamber apparatus for carrying out pre-lithiation, which is designed to control the water content in a pre-lithiation atmosphere.

Technical Solution

In one aspect of the present disclosure, there is provided a pre-lithiation reaction chamber apparatus according to any one of the following embodiments. According to the first embodiment of the present disclosure, there is provided a pre-lithiation reaction chamber apparatus including a pre-lithiation reaction vessel, the pre-lithiation reaction vessel including an electrolyte including a lithium salt, a negative electrode for a lithium secondary battery and a lithium ion-supplying member, wherein each of the negative electrode for the lithium secondary battery and the lithium ion-supplying member is at least partially in contact with the electrolyte. The pre-lithiation reaction chamber apparatus further includes a water-capturing vessel, the water-capturing vessel including water-capturing powder, a container configured to receive the water-capturing powder, and a position-changing member configured to change a position of the water-capturing powder in the container.

According to the second embodiment of the present disclosure, there is provided the pre-lithiation reaction chamber apparatus as defined in the first embodiment, wherein the position-changing member includes a rotatable shaft mounted to an inner wall of the container.

According to the third embodiment of the present disclosure, there is provided the pre-lithiation reaction chamber apparatus as defined in the first or the second embodiment, wherein the position-changing member includes: a rotatable shaft mounted to an inner wall of the container; and a spiral thread located on the rotatable shaft.

According to the fourth embodiment of the present disclosure, there is provided the pre-lithiation reaction chamber apparatus as defined in any one of the first to the third embodiments, wherein the position-changing member includes: a rotatable shaft mounted to an inner wall of the container; and an agitation fan mounted to the rotatable shaft such that an axis of the agitation fan is parallel to an axis of the rotatable shaft.

According to the fifth embodiment of the present disclosure, there is provided the pre-lithiation reaction chamber apparatus as defined in the fourth embodiment, wherein the agitation fan extends at an angle of less than 90° with respect to the axis of the rotatable shaft.

According to the sixth embodiment of the present disclosure, there is provided the pre-lithiation reaction chamber apparatus as defined in any one of the first to the third embodiments, wherein the position-changing member includes: a rotatable shaft mounted to an inner wall of the container; and an agitation fan mounted to the rotatable shaft such that an axis of the agitation fan is perpendicular to an axis of the rotatable shaft.

According to the seventh embodiment of the present disclosure, there is provided the pre-lithiation reaction chamber apparatus as defined in the first embodiment, wherein the position-changing member is a vibrating member located at a bottom of the container.

According to the eighth embodiment of the present disclosure, there is provided the pre-lithiation reaction chamber apparatus as defined in any one of the third to the sixth embodiments, which further includes a vibrating member located at a bottom of the container.

According to the ninth embodiment of the present disclosure, there is provided the pre-lithiation reaction chamber apparatus as defined in any one of the first to the eighth embodiments, wherein a magnetic body is located at a bottom, inner surface of the pre-lithiation reaction chamber apparatus, and a bottom of the container is made of a material magnetically attracted to the magnetic body.

In another aspect of the present disclosure, there is also provided a pre-lithiated negative electrode for a lithium secondary battery according to the following embodiment. According to the tenth embodiment of the present disclosure, there is provided a negative electrode for a lithium secondary battery which is pre-lithiated in the pre-lithiation reaction chamber apparatus as defined in any one of the first to the ninth embodiments.

Advantageous Effects

The pre-lithiation reaction chamber apparatus including a pre-lithiation reaction vessel according to the present disclosure controls the water content in a pre-lithiation atmosphere to a significantly low level, such as a level of less than 10 ppm, to inhibit damage upon the SEI film on a negative electrode, while allowing a desired level of pre-lithiation of the negative electrode.

In addition, a lithium secondary battery using the negative electrode pre-lithiated according to the present disclosure has an excellent initial coulombic efficiency and cycle capacity retention.

BEST MODE

Figure 1:
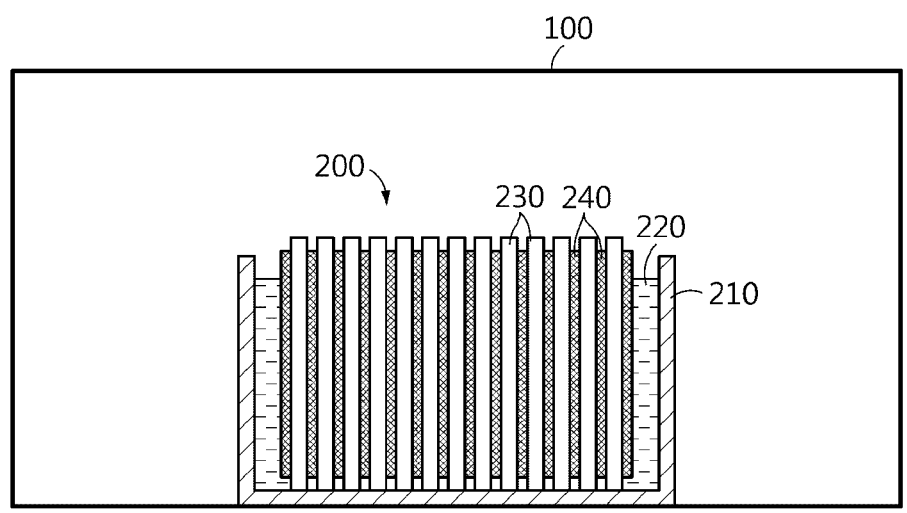
FIG. 1 is a schematic view illustrating a pre-lithiation reaction chamber apparatus including a pre-lithiation reaction vessel according to an embodiment of the related art.

Hereinafter, preferred embodiments of the present disclosure will be described in detail with reference to the accompanying drawings.

In one aspect of the present disclosure, there is provided a pre-lithiation reaction chamber apparatus including a pre-lithiation reaction vessel, wherein the pre-lithiation reaction vessel includes an electrolyte, a negative electrode for a lithium secondary battery and a lithium ion-supplying member, each of the negative electrode for a lithium secondary battery and the lithium ion-supplying member is at least partially in contact with the electrolyte, the electrolyte includes a lithium salt, the pre-lithiation reaction chamber apparatus further includes a water-capturing vessel, and the water-capturing vessel includes: water-capturing powder; a container configured to receive the water-capturing powder; and a position-changing member configured to change the position of the water-capturing powder in the container.

The water-capturing powder used for the water-capturing vessel is provided in the form of powder and is not particularly limited, as long as it can be used conventionally in the art. Non-limiting examples of the water-capturing powder include $CaO$, $MgO$, $CaCl_2$, $CaCO_3$, $CaZrO_3$, $CaTiO_3$, $SiO_2$, $Ca_2SiO_4$, $MgCl_2$, $P_2O_5$, $Li_2O$, $Na_2O$, $BaO$, $Li_2SO_4$, $Na_2SO_4$, $CaSO_4$, $MgSO_4$, $CoSO_4$, $Ga_2(SO_4)_3$, $Ti(SO_4)_2$, $NiSO_4$, $SrCl_2$, $YCl_3$, $CuCl_2$, $CsF$, $TaF_5$, $NbF_5$, $LiBr$, $CaBr_2$, $CeBr_3$, $SeBr_4$, $VBr_3$, $MgBr_2$, $BaI_2$, $MgI_2$, $Ba(ClO_4)_2$, $Mg(ClO_4)_2$ or a mixture thereof.

The container configured to receive the water-capturing powder is not particularly limited in its material, as long as the material does not react with the water-capturing powder or water. Particular examples of the material include SUS, plastic, a material attached to a magnetic body, stainless steel, or the like.

In addition, the container configured to receive the water-capturing powder is not particularly limited in terms of structure, as long as it is fabricated to have such a structure that water present in the pre-lithiation reaction chamber may be in contact with the water-capturing powder received in the container. For example, the container may have a cubic or cuboid shape, a shape five sides of which are closed and one side (top) of which is opened, a shape five sides of which are closed and one side of which has one or a plurality of holes, or a shape one or more sides of which are closed and the remaining sides of which has one or a plurality of holes. The container is fabricated in such a manner that the powder may be received inside thereof.

The container configured to receive the water-capturing powder may include a position-changing member, which can change the position of the water-capturing powder, inside thereof or at the bottom thereof.

In general, a viscous material is formed in the water-capturing powder used for capturing water, particularly on the surface layer of the water-capturing powder that is in contact with air, after the water-capturing powder captures water, i.e. reacts with water. Therefore, the water-capturing powder is not in contact with air any longer and it may be inhibited or prohibited from being in contact with water in the air. Therefore, the water-capturing powder dose not capture water in the air any longer. As a result, once the water-capturing vessel is disposed at a predetermined site for the purpose of capturing water, it undergoes degradation of its water-capturing function, after the lapse of a predetermined time.

According to the present disclosure, in order to solve the above-mentioned problem, the water-capturing powder is introduced to the pre-lithiation reaction chamber apparatus, while a position-changing member capable of changing the position of the water-capturing powder is disposed in the container, so that the water-capturing powder may realize its function for a long time. The position-changing member prevents formation of a viscous material on the surface layer of the water-capturing powder and interruption of contact between the powder and air. In this manner, the position-changing member allows the water-capturing powder to realize its water-capturing function continuously for a long time. As a result, the water content in the pre-lithiation reaction chamber apparatus is controlled extremely, and the negative electrode is pre-lithiated homogeneously and efficiently.

When the position-changing member is disposed in the container, it may be a rotating member. According to an embodiment of the present disclosure, the rotating member may be a rotating shaft mounted to the inner wall of the container.

Figure 2:
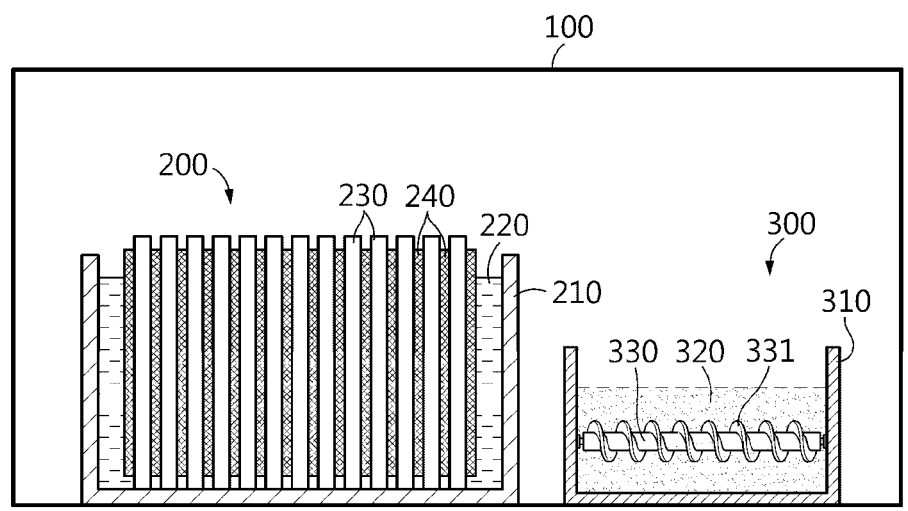
FIG. 2 is a schematic view illustrating a pre-lithiation reaction chamber apparatus, which further includes, in addition to a pre-lithiation reaction vessel, a water-capturing vessel, wherein the water-capturing vessel includes water-capturing powder, a container configured to receive the water-capturing powder, and a position-changing member configured to change the position of the water-capturing powder in the container, and the position-changing member is provided with a rotating shaft and a spiral thread formed on the rotating shaft, according to an embodiment of the present disclosure.

According to an embodiment of the present disclosure, the rotating member may include a rotating shaft 330 disposed from one sidewall to the other sidewall inside of the container 310, and a thread 331 formed spirally on the rotating shaft 330, as shown in FIG. 2. In the case of such a rotating member, while pre-lithiation is carried out in the pre-lithiation reaction vessel 200, the rotating shaft 330 is rotated and the thread 331 changes the position of the water-capturing powder 320 in the container 310 of the water-capturing vessel 300.

Figure 3:
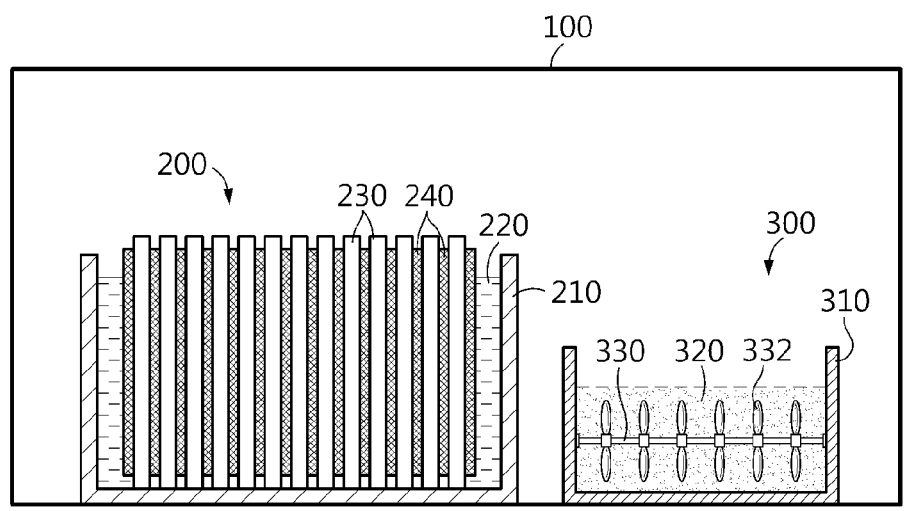
FIG. 3 is a schematic view illustrating a pre-lithiation reaction chamber apparatus, which further includes, in addition to a pre-lithiation reaction vessel, a water-capturing vessel, wherein the water-capturing vessel includes water-capturing powder, a container configured to receive the water-capturing powder, and a position-changing member configured to change the position of the water-capturing powder in the container, and the position-changing member is provided with a rotating shaft and an agitation fan mounted to the rotating shaft and rotating vertically to the rotating shaft, according to an embodiment of the present disclosure.

According to another embodiment of the present disclosure, the rotating member may include a rotating shaft 330 disposed from one sidewall to the other sidewall inside of the container 310, and an agitation fan 332 having two or more agitation fans mounted linearly to the rotating shaft 330, as shown in FIG. 3. In the case of such a rotating member, while pre-lithiation is carried out in the pre-lithiation reaction vessel 200, the rotating shaft 330 is rotated and the agitation fan 332 changes the position of the water-capturing powder 320.

Figure 4:
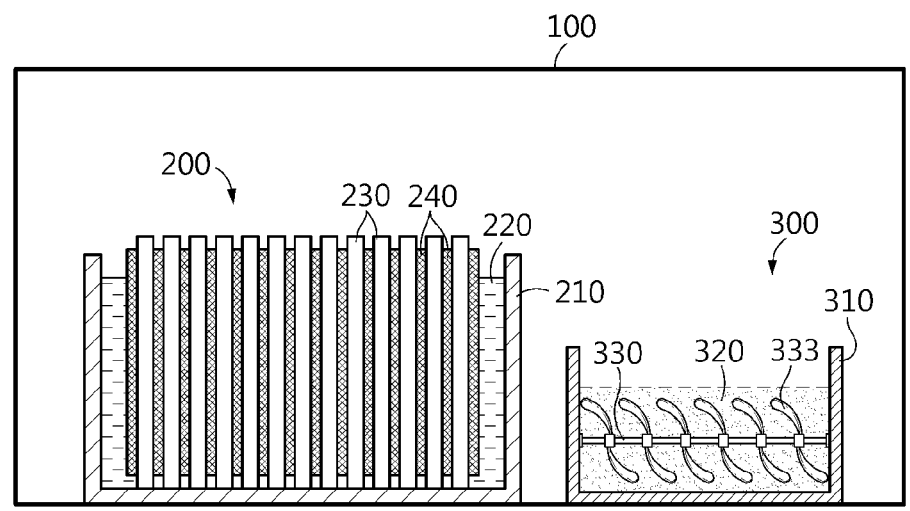
FIG. 4 is a schematic view illustrating a pre-lithiation reaction chamber apparatus, which further includes, in addition to a pre-lithiation reaction vessel, a water-capturing vessel, wherein the water-capturing vessel includes water-capturing powder, a container configured to receive the water-capturing powder, and a position-changing member configured to change the position of the water-capturing powder in the container, and the position-changing member is provided with a rotating shaft and an agitation fan formed with a streamlined shape, while forming an angle of less than 90° to the rotating shaft, and rotating about the rotating shaft, according to an embodiment of the present disclosure.

According to still another embodiment of the present disclosure, the rotating member may include a rotating shaft 330 disposed from one sidewall to the other sidewall inside of the container 310, and a modified agitation fan 333 having two or more agitation fans formed with a streamlined shape, while forming an angle of less than 90° to the rotating shaft 330, as shown in FIG. 4. In the case of such a rotating member, while pre-lithiation is carried out in the pre-lithiation reaction vessel 200, the rotating shaft 330 is rotated and the modified agitation fan 333 changes the position of the water-capturing powder 320. The modified agitation fan 333 as shown in FIG. 4 has a larger contact area with the water-capturing powder, as compared to the agitation fan 332 as shown in FIG. 3, and thus allows more efficient migration of the water-capturing powder.

Figure 5:
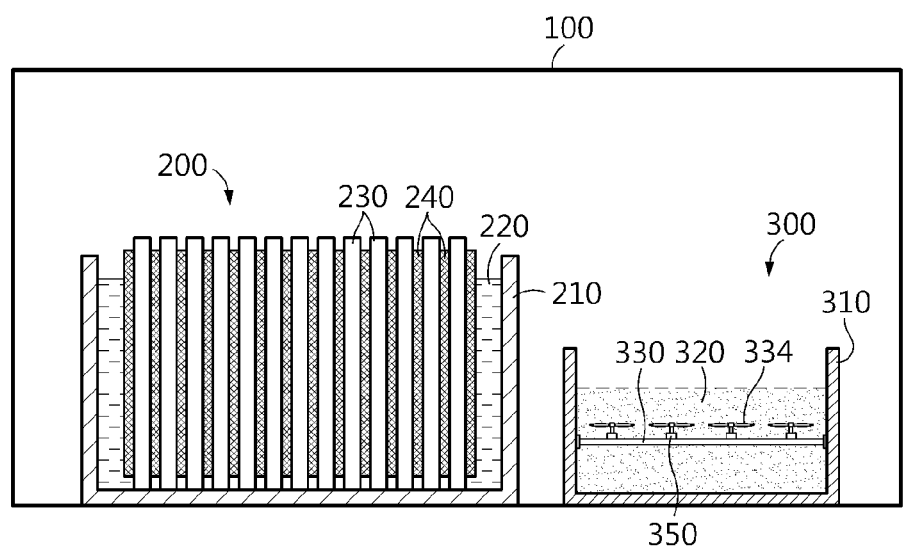
FIG. 5 is a schematic view illustrating a pre-lithiation reaction chamber apparatus, which further includes, in addition to a pre-lithiation reaction vessel, a water-capturing vessel, wherein the water-capturing vessel includes water-capturing powder, a container configured to receive the water-capturing powder, and a position-changing member configured to change the position of the water-capturing powder in the container, and the position-changing member is provided with a rotating shaft and an agitation fan mounted to the rotating shaft and rotating horizontally to the rotating shaft, according to an embodiment of the present disclosure.

According to still another embodiment of the present disclosure, the rotating member may include a rotating shaft 330 disposed from one sidewall to the other sidewall inside of the container 310, and a modified agitation fan 334 mounted to the rotating shaft 330 and rotating horizontally to the rotating shaft 330, as shown in FIG. 5. In the case of such a rotating member, while pre-lithiation is carried out in the pre-lithiation reaction vessel 200, the rotating shaft 330 is rotated and the modified agitation fan 334 changes the position of the water-capturing powder 320. The modified agitation fan 334 as shown in FIG. 5 can be rotated by a motor 350, is rotated in a direction different from the rotating direction of the agitation fans as shown in FIG. 3 and FIG. 4, i.e. not the vertical direction but the horizontal direction, and thus allows more efficient migration of the water-capturing powder.

Figure 6:
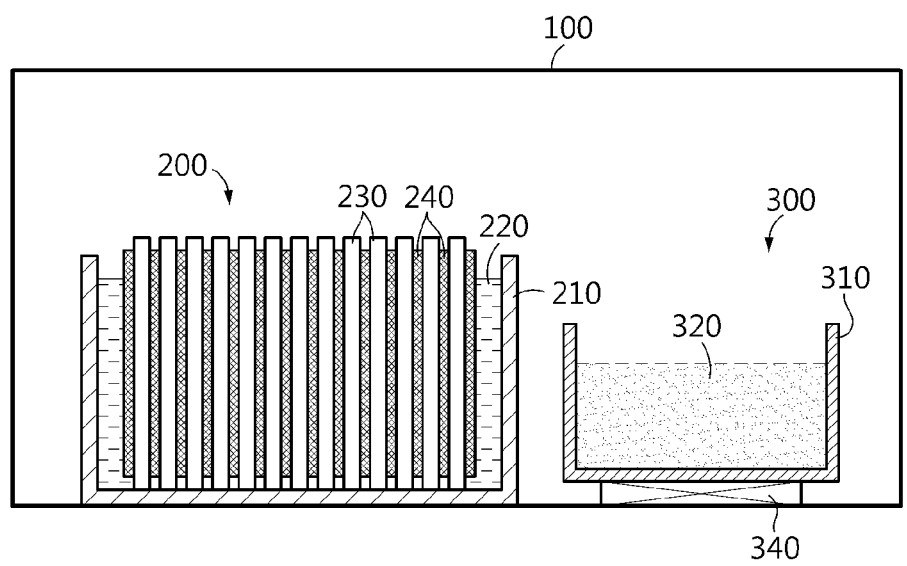
FIG. 6 is a schematic view illustrating a pre-lithiation reaction chamber apparatus, which further includes, in addition to a pre-lithiation reaction vessel, a water-capturing vessel, wherein the water-capturing vessel is a vibrating member located at the bottom of the container and providing vibration to the container, according to an embodiment of the present disclosure.
Figure 7:
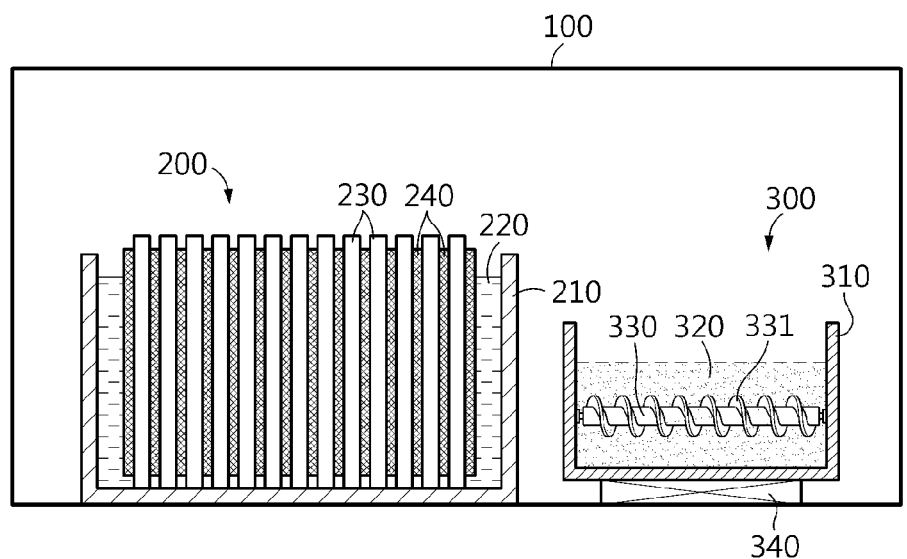
FIG. 7 is a schematic view illustrating a pre-lithiation reaction chamber apparatus, which further includes a member configured to provide vibration to the bottom of the water-capturing vessel of FIG. 2, according to an embodiment of the present disclosure.
Figure 8:
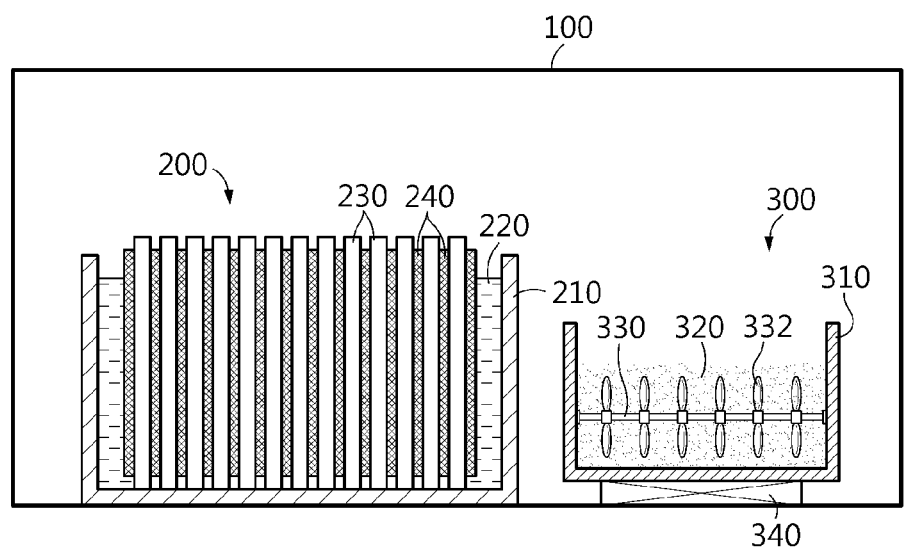
FIG. 8 is a schematic view illustrating a pre-lithiation reaction chamber apparatus, which further includes a member configured to provide vibration to the bottom of the water-capturing vessel of FIG. 3, according to an embodiment of the present disclosure.
Figure 9:
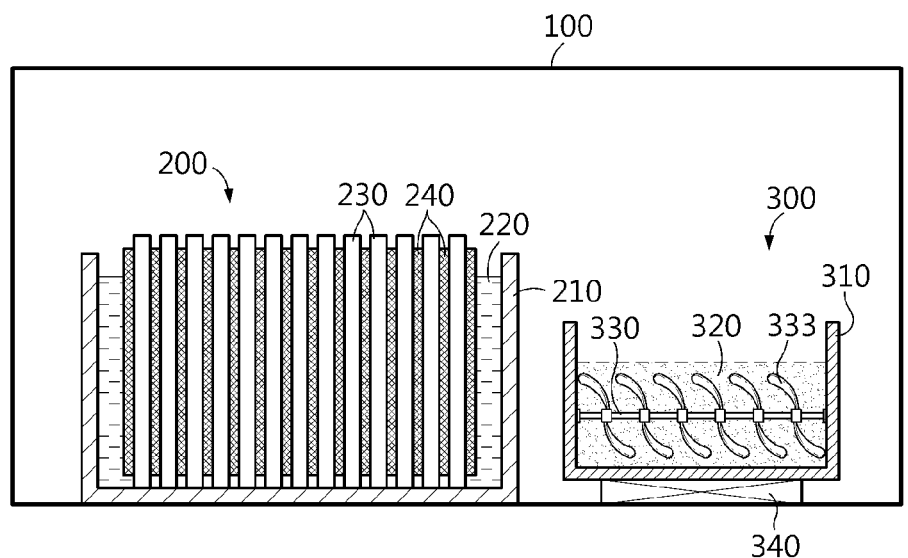
FIG. 9 is a schematic view illustrating a pre-lithiation reaction chamber apparatus, which further includes a member configured to provide vibration to the bottom of the water-capturing vessel of FIG. 4, according to an embodiment of the present disclosure.
Figure 10:
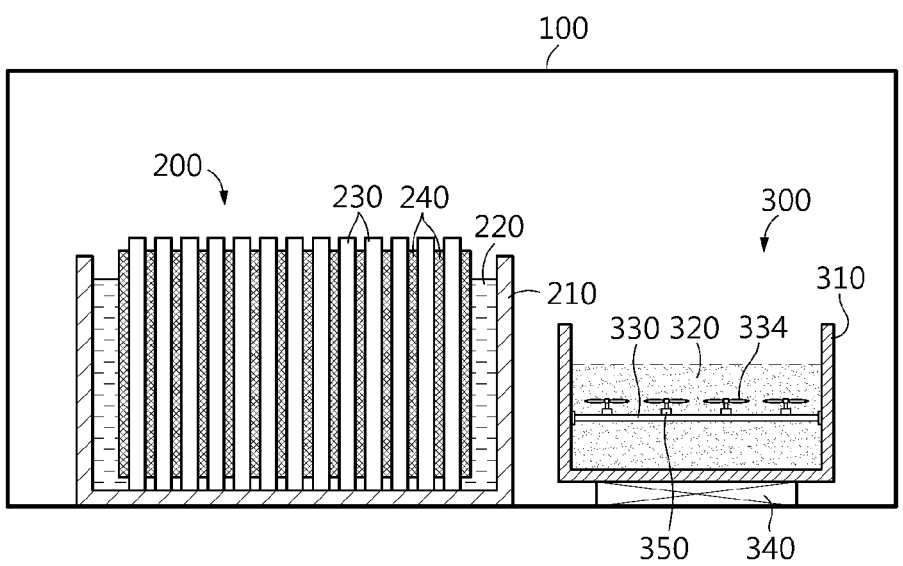
FIG. 10 is a schematic view illustrating a pre-lithiation reaction chamber apparatus, which further includes a member configured to provide vibration to the bottom of the water-capturing vessel of FIG. 5, according to an embodiment of the present disclosure.

When the position-changing member is disposed at the bottom of the container, it may be a vibrating member. Referring to FIG. 6 illustrating an embodiment of the present disclosure, water-capturing powder 320 is received in a container 310, and a vibrating member 340 may be disposed at the bottom of the container 310. The method for providing vibration through the vibrating member 340 is not particularly limited, as long as it meets the technical gist of the present disclosure.

FIG. 7 to FIG. 10 illustrate some embodiments of the present disclosure, wherein a vibrating member 340 is added to the bottom of the container in each of the embodiments as shown in FIG. 2 to FIG. 5 in order to allow more efficient migration of the water-capturing powder.

According to an embodiment of the present disclosure, when the bottom of the inside of the pre-lithiation reaction chamber apparatus is made of a magnetic body, the container of the water-capturing vessel, particularly the outside of the bottom of the container, may be made of a material stickable to the magnetic body in the pre-lithiation reaction chamber apparatus. Although the water-capturing vessel according to the present disclosure may be used for a long time by virtue of the position-changing member, there is a need for taking the water-capturing vessel out of the pre-lithiation reaction chamber apparatus for the purpose of exchanging the water-capturing powder, or the like. When a magnetic body is mounted to the bottom of the pre-lithiation reaction chamber apparatus according to an embodiment of the present disclosure, and the container of the water-capturing vessel, particularly the outside of the bottom of the container, is made of a material stickable to the magnetic body, the water-capturing vessel may be detached easily from the pre-lithiation reaction chamber apparatus, and if necessary, the water-capturing vessel including exchanged water-capturing powder may be attached back to the magnetic body of the bottom of the pre-lithiation reaction chamber apparatus. This embodiment is schematically illustrated in FIG. 11, wherein the container 310 including the water-capturing powder 320 is disposed on the magnetic body 110 installed in the pre-lithiation reaction chamber apparatus.

Figure 11:
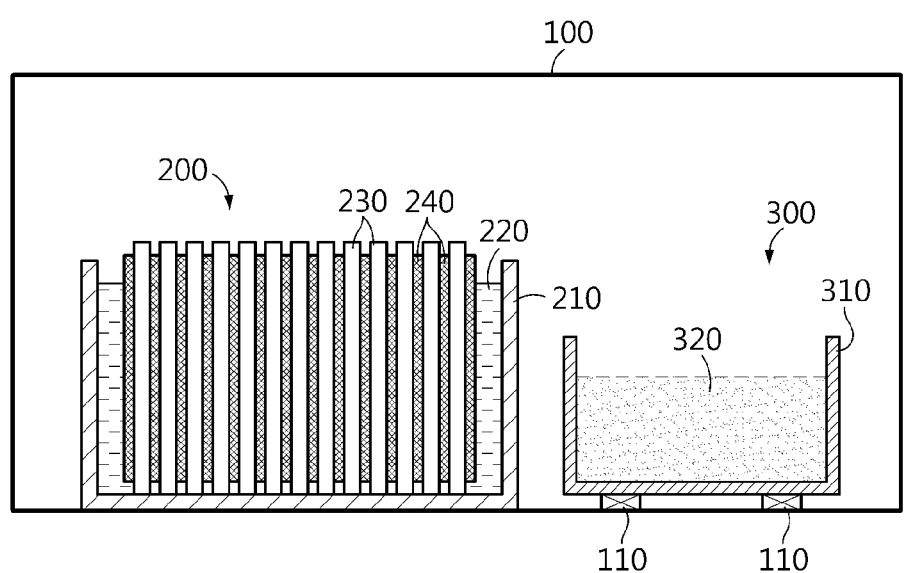
FIG. 11 is a schematic view illustrating a pre-lithiation reaction chamber apparatus, wherein the container of the water-capturing vessel is disposed on the magnetic body installed in the pre-lithiation reaction chamber apparatus, according to an embodiment of the present disclosure.

FIG. 11 is a schematic view illustrating a pre-lithiation reaction chamber apparatus, wherein the container of the water-capturing vessel is disposed on the magnetic body installed in the pre-lithiation reaction chamber apparatus, according to an embodiment of the present disclosure.

The pre-lithiation reaction chamber apparatus according to the present disclosure includes a pre-lithiation reaction vessel, and the pre-lithiation reaction vessel includes an electrolyte, a negative electrode for a lithium secondary battery and a lithium-supplying member, wherein each of the negative electrode and the lithium ion-supplying member is at least partially in contact with the electrolyte, and the electrolyte includes a lithium salt.

According to an embodiment of the present disclosure, the negative electrode includes, as a negative electrode active material, a carbonaceous material and/or Si.

The carbonaceous material may be crystalline artificial graphite, crystalline natural graphite, amorphous hard carbon, low-crystalline soft carbon, carbon black, acetylene black, Ketjen black, Super P, graphene, fibrous carbon, or a mixture of two or more of them, and preferably may be crystalline artificial graphite and/or crystalline natural graphite.

In general, the negative electrode is obtained by applying an electrode mixture including a negative electrode active material, conductive material and a binder to a negative electrode current collector, and carrying out drying. If necessary, the mixture may further include a filler.

Besides the above-mentioned materials, particular examples of the negative electrode active material include a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, an element of Group 1, Group 2 or Group 3 in the Periodic Table, or halogen; $0 < x \leq 1$; $1 \leq y \leq 3$; $1 \leq z \leq 8$), or the like; lithium metal; lithium alloy; silicon-based alloy; tin-based alloy; metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, or the like; a conductive polymer, such as polyacetylene; a Li—Co—Ni type material; titanium oxide; lithium titanium oxide, or the like. Particularly, the negative electrode active material may include a carbonaceous material and/or Si.

In general, the negative electrode current collector generally has a thickness of 3-500 μm. The negative electrode current collector is not particularly limited, as long as it has conductivity, while not causing any chemical change in the corresponding battery. Particular examples of the negative electrode current collector include copper, stainless steel, aluminum, nickel, titanium, baked carbon, copper or stainless steel surface-treated with carbon, nickel, titanium, silver, etc., aluminum-cadmium alloy, or the like. In addition, similarly to the positive electrode current collector, fine surface irregularities may be formed on the surface of the electrode current collector to reinforce the binding force to the negative electrode active material. The negative electrode current collector may be used in various shapes, including a film, sheet, foil, net, porous body, foamed body, non-woven web, or the like.

The conductive material is added generally in an amount of 1-50 wt % based on the total weight of the mixture including the negative electrode active material. Such a conductive material is not particularly limited, as long as it has conductivity, while not causing any chemical change in the corresponding battery. Particular examples of the conductive material include: graphite, such as natural graphite or artificial graphite; carbon black, such as carbon black, acetylene black, Ketjen black, channel black, furnace black, lamp black or thermal black; conductive fibers, such as carbon fibers or metallic fibers; fluorocarbon; metal powder, such as aluminum or nickel powder; conductive whiskers, such as zinc oxide or potassium titanate; conductive metal oxide, such as titanium oxide; conductive materials, such as a polyphenylene derivative; or the like. Meanwhile, a graphitic material having elasticity may be used as a conductive material, optionally in combination with the above-mentioned materials.

The binder is an ingredient which assists binding of the active material with the conductive material and binding to the current collector, and is added generally in an amount of 1-50 wt %, based on the total weight of the mixture including the negative electrode active material. Particular examples of the binder include polyvinylidene fluoride, polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, ethylene-propylene-diene terpolymer (EPDM), sulfonated EPDM, styrene butadiene rubber, fluororubber, various copolymers, or the like.

The filler is an ingredient which inhibits swelling of the negative electrode and is used optionally. Such a filler is not particularly limited, as long as it is a fibrous material, while not causing any chemical change in the corresponding battery. Particular examples of the filler include: olefinic polymers, such as polyethylene or polypropylene; and fibrous materials, such as glass fibers or carbon fibers.

The lithium ion-supplying member may be lithium metal, lithium powder or a mixture thereof.

Meanwhile, the electrolyte used for pre-lithiation may include a lithium salt and a non-aqueous solvent.

The lithium salt may be at least one selected from the group consisting of LiCl, LiBr, LiI, $LiClO_4$, $LiBF_4$, $LiB_{10}Cl_{10}$, $LiPF_6$, LiFSI, LiTFSI, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, lower aliphatic lithium carboxylates, and lithium 4-phenylborate. In addition, the non-aqueous solvent may be a carbonate solvent and/or ester solvent.

The electrolyte may further include an additive. The additive may be at least one selected from the group consisting of vinylene carbonate, vinyl ethylene carbonate, fluoroethyl carbonate, salicylic acid, $LiBF_4$, LiTFSL, LiBOB, and LiODFB.

In another aspect of the present disclosure, there is provided a pre-lithiated negative electrode, obtained by the method for pre-lithiation of a negative electrode.

In still another aspect of the present disclosure, there is provided a secondary battery which includes an electrode assembly including the pre-lithiated negative electrode, a positive electrode and a separator interposed between the pre-lithiated negative electrode and the positive electrode, and an electrolyte injected thereto. The secondary battery may be a lithium ion battery, lithium ion polymer battery, or a lithium polymer battery.

In general, the lithium secondary battery includes a positive electrode, a negative electrode, a separator interposed between the positive electrode and the negative electrode, and a lithium salt-containing non-aqueous electrolyte. Hereinafter, the other ingredients of the lithium secondary battery will be explained.

The positive electrode may be obtained by applying and drying a positive electrode active material on a positive electrode current collector, followed by pressing. If necessary, the above-mentioned conductive material, binder, filler, or the like, may be used additionally.

According to an embodiment of the present disclosure, the positive electrode may include, as a positive electrode active material, a lithium transition metal oxide represented by the following Chemical Formula 1 or Chemical Formula 2.

$$Li_xM_yMn_{2-y}O_{4-z}A_z \quad \text{[Chemical Formula 1]}$$

wherein M is Al, Mg, Ni, Co, Fe, Cr, V, Ti, Cu, B, Ca, Zn, Zr, Nb, Mo, Sr, Sb, W, Ti, Bi or a mixture of two or more of them;

A is at least one monovalent or divalent anion;

$0.9 \le x \le 1.2$; $0 < y < 2$; and $0 \le z < 0.2$.

$$(1-x)LiM'O_{2-y}A_{y}-xLi_2MnO_{3-y'}A_{y'} \quad \text{[Chemical Formula 2]}$$

wherein M' is $Mn_aM_b$;

M is Ni, Ti, Co, Al, Cu, Fe, Mg, B, Cr, Zr, Zn, or a mixture of two or more of them;

A is at least one selected from the anions consisting of $PO_4$, $BO_3$, $CO_3$, F and $NO_3$;

$0 < x < 1$; $0 < y \le 0.02$; $0 < y' \le 0.02$; $0.5 \le a \le 1.0$; $0 \le 0.5$; and $a+b=1$.

In addition to the lithium transition metal oxides represented by the above Chemical Formula 1 or Chemical Formula 2, particular examples of the positive electrode active material may include, but are not limited to: layered compounds, such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$, lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); lithium manganese composite oxides having a spinel structure, represented by $LiNi_xMn_{2-x}O_4$; $LiMn_2O_4$ in which Li is partially substituted with an alkaline earth metal ion; disulfide compounds; $Fe_2(MoO_4)_3$; or the like.

The positive electrode current collector generally has a thickness of 3-500 μm. The positive electrode current collector is not particularly limited, as long as it has high conductivity, while not causing any chemical change in the corresponding battery. Particular examples of the positive electrode current collector include stainless steel, aluminum, nickel, titanium, baked carbon, or aluminum or stainless steel surface-treated with carbon, nickel, titanium, silver, etc., or the like. The positive electrode current collector may be used in various shapes, including a film, sheet, foil, net, porous body, foamed body, non-woven web, or the like.

The separator is interposed between the positive electrode and the negative electrode, and a thin film-type insulating separator having high ion permeability and mechanical strength may be used. In general, the separator may have a pore diameter of 0.01-10 μm and a thickness of 5-300 μm. Particular examples of the separator include sheets or non-woven webs made of an olefinic polymer, such as polypropylene, having chemical resistance and hydrophobicity; glass fibers or polyethylene, or the like. When a solid electrolyte, such as a polymer, is used as an electrolyte, the solid electrolyte may also function as a separator.

The lithium salt-containing non-aqueous electrolyte includes a non-aqueous electrolyte and lithium, and the non-aqueous electrolyte that may be used include a non-aqueous organic solvent, organic solid electrolyte, inorganic solid electrolyte, or the like, but is not limited thereto.

Particular examples of the non-aqueous organic solvent include aprotic organic solvents, such as N-methyl-2-pyrrolidinone, propylene carbonate, ethylene carbonate, butylene carbonate, dimethyl carbonate, diethyl carbonate, gamma-butyrolactone, 1,2-dimethoxyethane, 2-methyl tetrahydrofuran, dimethyl sulfoxide, 1,3-dioxolane, formamide, dimethyl formamide, dioxolane, acetonitrile, nitromethane, methyl formate, methyl acetate, triphosphate, trimethoxy methane, dioxolane derivatives, sulfolane, methyl sulfolane, 1,3-dimethyl-2-imidazolidinone, propylene carbonate derivatives, tetrahydrofuran derivatives, ethers, methyl propionate, ethyl propionate, or the like.

Particular examples of the organic solid electrolyte include polyethylene derivatives, polyethylene oxide derivatives, polypropylene derivatives, phosphate polymers, polyagiation lysine, polyester sulfide, polyvinyl alcohol, polyvinylidene fluoride, polymers containing an ionically dissociable group, or the like.

Particular examples of the inorganic solid electrolyte include Li nitrides, halides, sulfates, or the like, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SoS_2$, etc.

The lithium salt is a substance that can be dissolved easily in the non-aqueous electrolyte. Particular examples of the lithium salt include LiCl, LiBr, LiI, $LiClO_4$, $LiBF_4$, $LiB_{10}Cl_{10}$, $LiPF_6$, LiFSI, LiTFSI, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, lower aliphatic lithium carboxylates, lithium 4-phenylborate, imide, or the like.

In addition, the lithium salt-containing non-aqueous electrolyte may further include additives, such as pyridine, triethyl phosphite, triethanolamine, cyclic ethers, ethylene diamine, n-glyme, triamide hexaphosphate, nitrobenzene derivatives, sulfur, quinone imine dyes, N-substituted oxazolidinone, N,N-substituted imidazolidine, ethylene glycol dialkyl ether, ammonium salt, pyrrole, 2-methoxyethaol and aluminum trichloride, in order to improve the charge/discharge characteristics, flame resistance, or the like. Optionally, the lithium salt-containing non-aqueous electrolyte may further include a halogen-containing solvent, such as carbon tetrachloride or trifluoroethylene, in order to impart non-combustibility. The lithium salt-containing non-aqueous electrolyte may further include carbon dioxide gas in order to improve the high-temperature storage characteristics. In addition, the lithium salt-containing non-aqueous electrolyte may further include fluoro-ethylene carbonate (FEC), propene sultone (PRS), or the like.

In yet another aspect of the present disclosure, there are provided a battery module including the secondary battery as a unit cell, a battery pack including the battery module, and a device including the battery pack as a power source.

Particular examples of the device include an electric vehicle, hybrid electric vehicle, plug-in hybrid electric vehicle, power storage system, or the like, but are not limited thereto.

Hereinafter, the present disclosure will be explained in more detail with reference to Examples and Test Examples. This disclosure may, however, be embodied in many different forms and should not be construed as limited to the exemplary embodiments set forth therein. It will be apparent that these exemplary embodiments are provided so that the present disclosure will be complete and understood easily by those skilled in the art.

EXAMPLE 1

<Manufacture of Negative Electrode>

First, 95 wt % of graphite as a negative electrode active material, 5 wt % of denka black as a conductive material, 3.5 wt % of styrene-butadiene rubber (SBR) as a binder, and 1.5 wt % of CMC as a thickener were added to water to prepare negative electrode slurry. The negative electrode mixture slurry was coated on a copper current collector and vacuum dried at 120° C., followed by pressing, to obtain a negative electrode.

<Constitution of Pre-lithiation Reaction Vessel>

To carry out pre-lithiation by using the negative electrode ($5 \times 5$ cm$^2$) and lithium metal as a counter electrode, an electrolyte containing 0.5 M LIFSI+0.5 M LiPF$_6$ dissolved in a mixed organic solvent of ethylene carbonate (EC)/ethyl methyl carbonate (EMC)=1/9 (volume ratio) was prepared.

<Constitution of Water-Capturing Vessel>

As a water-capturing vessel, a container made of SUS and having a cubic shape opened at the top side as shown in FIG. 2 was prepared, and a rotating shaft was mounted to the inner wall in the container and a position-changing member provided with a spiral thread formed on the rotating shaft was installed. Then, 100 g of phosphorus pentaoxide (P$_2$O$_5$) was introduced to the container to provide a water-capturing vessel.

<Pre-Lithiation>

The pre-lithiation reaction vessel was introduced to a pre-lithiation reaction chamber apparatus before carrying out pre-lithiation. The pre-lithiation reaction chamber apparatus had a dimension of 30 cm×25 cm×50 cm. In addition, the water-capturing vessel was introduced to the pre-lithiation reaction chamber apparatus, while being spaced apart from the pre-lithiation reaction vessel so that it might not be in direct contact with the vessel, and an electric current of 1 mA/cm$^2$ was applied thereto to carry out electrochemical charging. In this manner, pre-lithiation was carried out. The pre-lithiation was set under a limited capacity condition with a charging limit of 4.5% of the negative electrode capacity.

<Manufacture of Lithium Secondary Battery>

A coin-type battery was manufactured by using the negative electrode and LiCoO$_2$ as a counter electrode. Then, an electrolyte containing 0.5 M LIFSI+0.5 M LiPF$_6$ dissolved in a mixed organic solvent of ethylene carbonate (EC)/ethyl methyl carbonate (EMC)=1/9 (volume ratio) was used for the battery.

EXAMPLE 2

Pre-lithiation was carried out to provide a pre-lithiated negative electrode in the same manner as Example 1, except that a current density of 2 mA/cm$^2$ was applied in the pre-lithiation step. The pre-lithiated negative electrode was used to obtain a lithium secondary battery.

COMPARATIVE EXAMPLE 1

Pre-lithiation was carried out to provide a pre-lithiated negative electrode by using the same pre-lithiation reaction chamber as Example 1, except that the water-capturing vessel include no position-changing member and the water-capturing powder could not undergo a change in position in the container. The pre-lithiated negative electrode was used to obtain a lithium secondary battery.

COMPARATIVE EXAMPLE 2

Pre-lithiation was carried out to provide a pre-lithiated negative electrode by using the same pre-lithiation reaction chamber as Example 2, except that the water-capturing vessel include no position-changing member and the water-capturing powder could not undergo a change in position in the container. The pre-lithiated negative electrode was used to obtain a lithium secondary battery.

COMPARATIVE EXAMPLE 3

Pre-lithiation was carried out to provide a pre-lithiated negative electrode by using the same pre-lithiation reaction chamber as Example 1, except that the water-capturing vessel, including the position-changing powder, was not used. The pre-lithiated negative electrode was used to obtain a lithium secondary battery.

COMPARATIVE EXAMPLE 4

Pre-lithiation was carried out to provide a pre-lithiated negative electrode by using the same pre-lithiation reaction chamber as Example 2, except that the water-capturing vessel, including the position-changing powder, was not used. The pre-lithiated negative electrode was used to obtain a lithium secondary battery.

TEST EXAMPLE

Cycle Charge/Discharge Test

Each of the coin-type lithium secondary batteries according to Examples 1 and 2 and Comparative Examples 1-4 was determined for its cycle characteristics by using an electrochemical charger. The battery was charged to 4.2V (vs. Li/Li$_+$) and discharged to 3.0V (vs. Li/Li$^+$) at a current density of 0.1 C up to the fifth cycle. From the fourth cycle, charge/discharge was carried out at a current density of 0.5 C under the same voltage condition. The results are shown in the following Table 1.

TABLE 1

| | Use of water-capturing powder | Use of position-changing member | Charge current density (mA/cm$^2$) | OCV of electrode after prelithiation (V) | Discharge capacity (mAh) | Initial coulombic efficiency (%) | Capacity retention at 100$^{th}$ cycle (%) |
|---|---|---|---|---|---|---|---|
| Ex. 1 | ○ (P$_2$O$_5$ powder) | ○ | 1 | 0.15 | 228 | 105 | 98 |
| Ex. 2 | ○ (P$_2$O$_5$ powder) | ○ | 2 | 0.20 | 212 | 103 | 96 |
| Comp. Ex. 1 | ○ (P$_2$O$_5$ powder) | X | 1 | 0.41 | 158 | 97 | 92 |
| Comp. Ex. 2 | ○ (P$_2$O$_5$ powder) | X | 2 | 0.53 | 76 | 95 | 90 |
| Comp. Ex. 3 | X | X | 1 | 0.78 | 54 | 92 | 82 |
| Comp. Ex. 4 | X | X | 2 | 1.25 | 12 | 88 | 75 |

It can be seen from the above results that Examples 1 and 2 show a lower electrode OCV after pre-lithiation, as compared to Comparative Examples 1 and 2. This suggests that the water content in the pre-lithiation reaction chamber apparatus is controlled sufficiently so that the charged negative electrode may be protected well by a solid electrolyte interphase (SEI) film. On the contrary, the lithium secondary batteries using the pre-lithiated negative electrodes according to Comparative Examples 1-4 show a high OCV and low discharge capacity, despite pre-lithiation, since the SEI layer of each negative electrode is broken due to the water content present in the pre-lithiation reaction chamber apparatus, and thus pre-lithiation cannot be performed to a desired level.

In addition, referring to cycle characteristics and initial efficiency, it can be seen that each of the lithium secondary batteries according to Examples 1 and 2 shows a high initial efficiency and high capacity retention at the 100$^{th}$ cycle. It is thought that this is because the lithium secondary batteries according to Examples 1 and 2 use a negative electrode pre-lithiated under a condition with an effectively controlled water content, unlike Comparative Examples 1-4. In the case of Comparative Examples 1-4, it is thought that the SEI layer on each negative electrode surface is not homogeneous to cause a partial side reaction of the electrolyte, resulting in a loss of capacity. In addition, it is thought that resistance is increased due to the electrolyte decomposition products to provide a low initial efficiency and low capacity retention at the 100$^{th}$ cycle.

What is claimed is:

1. A pre-lithiation reaction chamber apparatus comprising:
a pre-lithiation reaction vessel, the pre-lithiation reaction vessel including:
an electrolyte comprising a lithium salt;
a negative electrode for a lithium secondary battery; and
a lithium ion-supplying member,
wherein each of the negative electrode for the lithium secondary battery and the lithium ion-supplying member is at least partially in contact with the electrolyte; and
a water-capturing vessel, the water-capturing vessel including:
water-capturing powder;
a container configured to receive the water-capturing powder; and
a position-changing member configured to change a position of the water-capturing powder in the container.

2. The pre-lithiation reaction chamber apparatus according to claim 1, wherein the position-changing member comprises a rotatable shaft mounted to an inner wall of the container.

3. The pre-lithiation reaction chamber apparatus according to claim 2, wherein the position-changing member further comprises a spiral thread located on the rotatable shaft.

4. The pre-lithiation reaction chamber apparatus according to claim 2, wherein the position-changing member further comprises an agitation fan mounted to the rotatable shaft such that an axis of the agitation fan is parallel to an axis of the rotatable shaft.

5. The pre-lithiation reaction chamber apparatus according to claim 4, wherein the agitation fan extends at an angle of less than 90° with respect to the axis of the rotatable shaft.

6. The pre-lithiation reaction chamber apparatus according to claim 2, wherein the position-changing member further comprises an agitation fan mounted to the rotatable shaft such that an axis of the agitation fan is perpendicular to an axis of the rotatable shaft.

7. The pre-lithiation reaction chamber apparatus according to claim 1, wherein the position-changing member is a vibrating member located at a bottom of the container.

8. The pre-lithiation reaction chamber apparatus according to claim 2, further comprising a vibrating member located at a bottom of the container.

9. The pre-lithiation reaction chamber apparatus according to claim 1, wherein a magnetic body is located at a bottom, inner surface of the pre-lithiation reaction chamber apparatus, and a bottom of the container is made of a material magnetically attracted to the magnetic body.

* * * * *